(12) United States Patent
Ferman

(10) Patent No.: US 7,131,611 B2
(45) Date of Patent: Nov. 7, 2006

(54) DEVICE AND METHOD OF CONTROL OF FIXED AND VARIABLE GEOMETRY RHOMBOID WINGS

(75) Inventor: Marty Allen Ferman, St. Louis, MO (US)

(73) Assignee: Saint Louis University

( * ) Notice: Subject to any disclaimer, the term of this patent is extended or adjusted under 35 U.S.C. 154(b) by 0 days.

(21) Appl. No.: 10/903,457

(22) Filed: Jul. 30, 2004

(65) Prior Publication Data

US 2006/0022085 A1 Feb. 2, 2006

(51) Int. Cl.
B64C 27/00 (2006.01)
(52) U.S. Cl. .......................................... 244/39
(58) Field of Classification Search .............. 244/7, 244/38, 39, 45 R, 46, 47, 48, 49
See application file for complete search history.

(56) References Cited

U.S. PATENT DOCUMENTS

| | | | | |
|---|---|---|---|---|
| 3,478,987 A | * | 11/1969 | Dorand | 244/212 |
| 3,942,747 A | * | 3/1976 | Wolkovitch | 244/13 |
| 3,980,257 A | | 9/1976 | Koch et al. | |
| 4,330,100 A | * | 5/1982 | Elber | 244/48 |
| 4,336,914 A | * | 6/1982 | Thomson | 244/46 |
| 4,364,531 A | * | 12/1982 | Knoski | 244/3.27 |
| 4,541,593 A | * | 9/1985 | Cabrol | 244/45 R |
| 4,856,736 A | * | 8/1989 | Adkins et al. | 244/45 R |
| 5,039,030 A | * | 8/1991 | Kraus | 244/3.28 |
| 5,651,513 A | * | 7/1997 | Arena | 244/74 R |
| 5,681,014 A | * | 10/1997 | Palmer | 244/219 |
| 5,899,410 A | * | 5/1999 | Garrett | 244/45 R |
| 6,053,453 A | | 4/2000 | Saiz | |
| 6,089,503 A | * | 7/2000 | Volk | 244/48 |
| 6,644,599 B1 | * | 11/2003 | Perez | 244/219 |
| 6,682,023 B1 | | 1/2004 | Broadbent | |

OTHER PUBLICATIONS

"Spherical Joints", www.thk.de/pdf/BL-300E.pdf, pp. 1-10 (date Jun. 15, 2004 from www.archive.org).*
Ferman, Marty Allen, "A Modern Approach to Wing Warp for Aircraft Control," Presented at the EAA Air Venture 1998, Osk Kosh, WI, Jul. 29-Aug. 4, 1998.
Ferman, Marty Allen, "Use of Torsion Bars for Twist, Air Loads, and Control of Fixed and Variable Geometry Rhomboid Wings," Presented at the EAA Air Venture 2004, Osh Kosh, WI, Jul. 27-Aug. 4, 2004.

* cited by examiner

*Primary Examiner*—Teri Pham Luu
*Assistant Examiner*—S. A. Holzen

(57) ABSTRACT

Provided is an aerodynamic body having rhomboid wings and internal torsion bars which can be twisted to affect a change in the shape of a wing. Individual or multiple swings can slide relative to the fuselage body to affect a change in sweep angle and aspect ratio. Provided is a method of controlling the aerodynamic properties, in order to affect stability and maneuvering, of an aerodynamic body by warping the wings by twisting one or more torsion bars located internal to one or more wings. Additional control can be exercized by sliding one of more wings relative to the fuselage to change the sweep angle and aspect ratio.

10 Claims, 6 Drawing Sheets

DETAILED SINGLE TORQUE TUBE CONCEPT

MULTIPLE CONCENTRIC TORQUE TUBE CONCEPT

DEVICE AND METHOD OF CONTROL OF FIXED AND VARIABLE GEOMETRY RHOMBOID WINGS

BACKGROUND OF THE INVENTION

1. Field of the Invention

The invention presented is directed toward a variable geometry rhomboid wing aircraft with a mechanical or powered torsion bar to control aeroelastic twist and deflection to produce an aerodynamic body.

2. Description of the Related Art

Control of wing and stabilizer surfaces is essential to controlling the direction of flight of an aerodynamic body. For most aircraft, a system of elevators, a rudder, flaps and slats, and ailerons are used to control the movement of the aircraft. Fine maneuverability and banking flight is enabled by ailerons, which can be manipulated to alter the lift and drag for each wing. Alternatively, a wing may be warped to change its aerodynamic properties and obtain similar effects as with ailerons. The Wright Brothers employed a system of bell cranks and pulleys to warp the wing to obtain a fine degree of flight control and banking turns. Today, as new stronger and more flexible composite materials have become available, wing warping is once again becoming a more practicable approach to controlling flight of an aerodynamic body.

Torsion bars, which can be placed along the length of the wing and connected to the wing tip, are an alternative to the Wrights' bell cranks and pulleys as a means for warping a wing to change its aerodynamic properties. U.S. Pat. No. 5,681,014, which is herein incorporated by reference, teaches the use of a torque tube mounted internally in a wing to produce a helicoidal twist with a maximum deflection at the wing tip, to provide increased lateral roll control, lift, braking and maneuverability. Additionally, torsion bars allow flexible wings to stiffen against forces that would cause wing rotation at high flight speeds. U.S. Pat. No. 4,330,100, which is herein incorporated by reference, teaches a wing twist control mechanism comprising a torque tube, which assists high aspect ratio wings to actively compensate for changes in the aerodynamic loads that affect wing twist.

In addition to controlling the lift and drag of surfaces by warping a wing or attenuating ailerons, an aerodynamic body is also affected by the aspect ratio, which affects the overall lift to drag ratio. Aspect ratio is equal to the wing span$^2$/wing area. Thus a longer wing span results in a greater lift to drag ratio of the aerodynamic body. Wing sweep angle is another important aspect in the design of an aerodynamic body. Wings with a lesser sweep angle (i.e., less swept back) have greater lift. Wings having a greater sweep angle, while having less lift, will delay undesirable compression effects at speeds close to the speed of sound. Variable geometry wings are a solution to allowing optimal lift at low air speeds and optimal stability at near sound speeds.

Variable geometry rhomboid wing aircraft are a type of joined wing concept where the two forward wings are swept back, while the rear wing is swept forward. Each pair of forward and rear wings on the same side are then joined at a point along the wing surface and form a triangular shape from the two wings and the section of the fuselage between the wings. The angles in this triangle are allowed to vary by making either of both of the wing mounts variable in position on the fuselage. This type of wing assembly has improved aerodynamic properties as some flight control parameters can be adjusted during flight by varying the wing positions. U.S. Pat. No. 5,899,410, which is herein incorporated by reference, teaches an aerodynamic body having coplanar joined wings forming a rhomboid wing.

SUMMARY OF THE INVENTION

The inventor herein describes an aerodynamic body comprising a torsion bar and a rhomboid wing of either fixed geometry or variable geometry.

Thus, an object of the invention is an improved aerodynamic body comprising (a) a torsion bar, which can adjust the lift to drag ratio of a wing to optimize performance and maneuvering under various flight conditions and to control aeroelastic twist, deflection and flutter, and (b) a rhomboid wing, which may be fixed or movable to provide variable geometry. This improved aerodynamic body can allow for the elimination, or at least the minimization of control surfaces, e.g., ailerons, while at the same time optimizing the lift to drag ratio and the control of aeroelastic motions and loads, maneuvering, and performance of the aerodynamic body.

Another object of the invention is a method to control flight of an aerodynamic body by applying a force to the proximal end of a torsion bar in a wing to effect a change in deflection of the wing along its entire length and at the tip. By changing the deflection of the wing, that is wing warping or wing morphing, the wing can adapt to loads to increase the maneuverability and stability of the aerodynamic body. Additionally, the control of flight can be additionally affected by changing the overall geometry of the rhomboid wing assembly by moving backward or forward the rear wing, the front wing, or both.

DETAILED DESCRIPTION OF AN EMBODIMENT OF THE INVENTION

An improved aerodynamic body is provided which combines the desirable properties of a variable geometry rhomboid wing with the flutter stability and wing warping control of a torsion bar.

Figure 1:
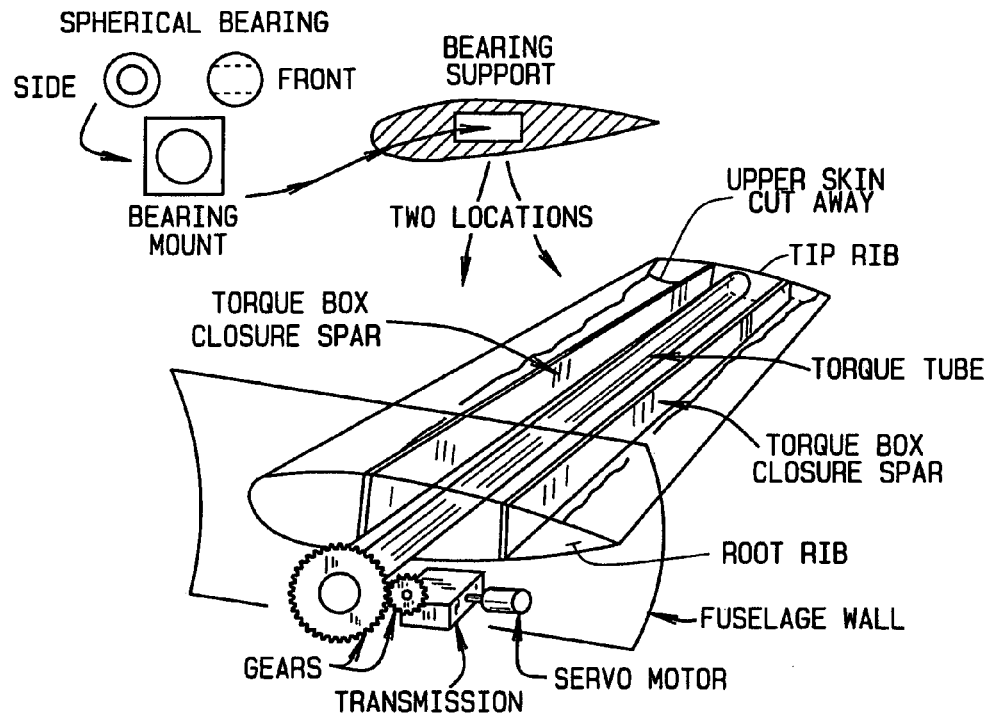
FIG. 1 depicts single and concentric torque tube, motor and servo within a wing.
Figure 1:
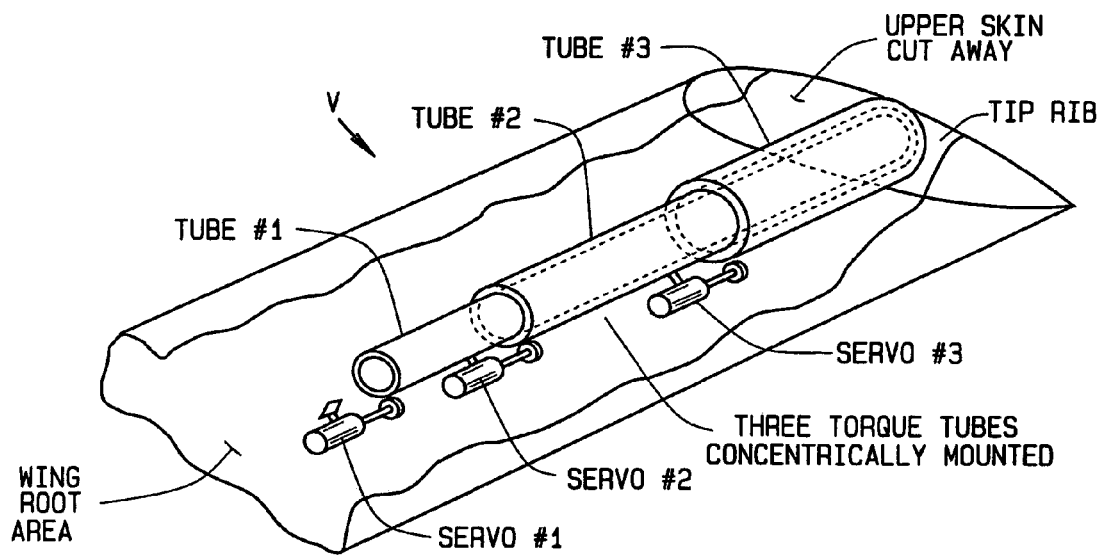

Torsion bars are described which may be used to twist a wing. The torsion bars connect to the wing tip rib and are driven by one or more actuators to perform the twist required. The torsion bars are supported by the wing ribs with bearings to allow the twist, and at least a few spherical bearings should be used to allow large wing bending motion without binding. The simplest concept is a single torsion bar, wherein a torque applied to the root end of the torsion bar can directly twist the wing tip. Thus, the entire wing twists proportionately (references 1–3). Additionally, concentric multiple torsion bars may be used (FIG. 1).

While Walkovitch is often considered by those skilled in the art to which this invention is directed as a pioneer of the rhomboid wing concept (see reference 7), the history of the rhomboid wing may begin as early as circa 1911 with Edwards, who teaches a bi-plane design with rhomboidal features (reference 18). (Additional rhomboid wing art is described in references 7–17). A rhomboid wing design was tested by the inventor in the Parks College water tunnel to evaluate flow properties about the wing including the trailing vortices (described in references 4–6). These water tunnel studies were extended in reference 19 to further examine an apparent downwash reversal at high angles of attack. Both of those studies demonstrated that the rhomboid wing model did not stall up to 30 degrees of angle of attack. In those studies, wind tunnel tests were also run to measure the lift and drag.

Figure 2:
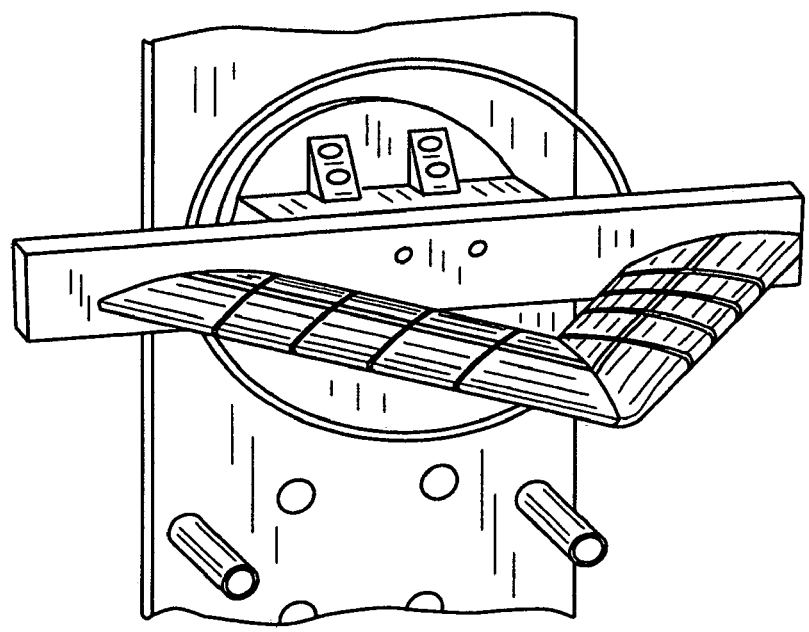
FIG. 2 depicts a drawing of a photograph of a flutter model of the fore wings of a rhomboid wing.

Next a flutter model design and testing of a rhomboid wing was carried out under the direction of the inventor to develop a better understanding of the vibration and flutter of the complex rhomboid wing design (reference 20). A drawing of the model is shown in FIG. 2.

Figure 3:
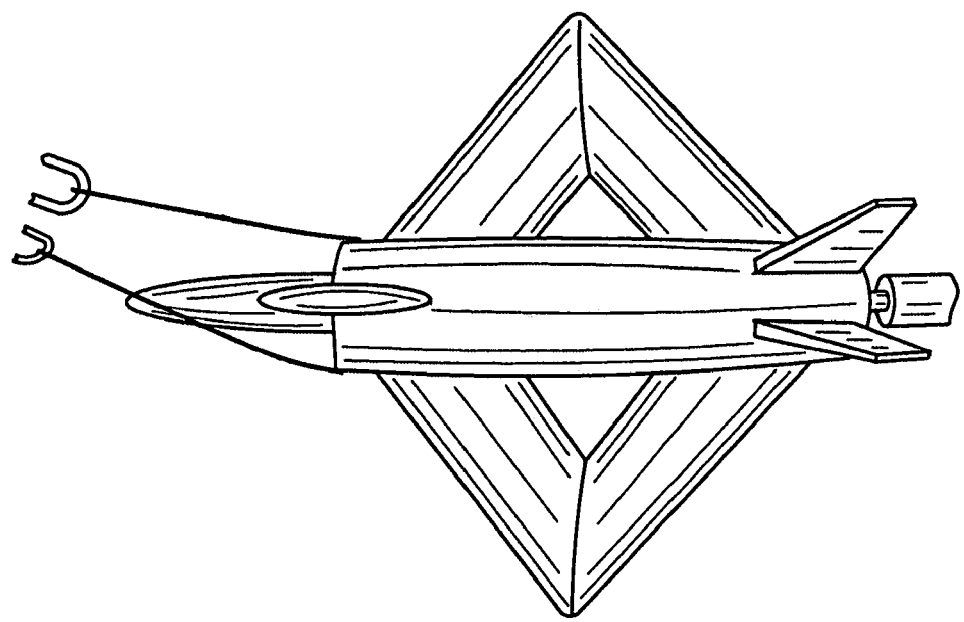
FIG. 3 depicts a drawing of a photograph of a model of an aerodynamic body comprising rhomboid wing and fuselage.

A project was recently initiated by the inventor to examine the buffet properties of the fixed wing rhomboid (FIG. 3). In that work, water tunnel studies and wind tunnel studies were performed and are on-going to evaluate the buffet properties of the flow about the rhomboid wing described in references 4–6, but using a more representative body similar to that of the F-15 design concept. This allows vortex separation to be studied, as it has been a concern for standard aircraft configurations for many years.

Figure 4:
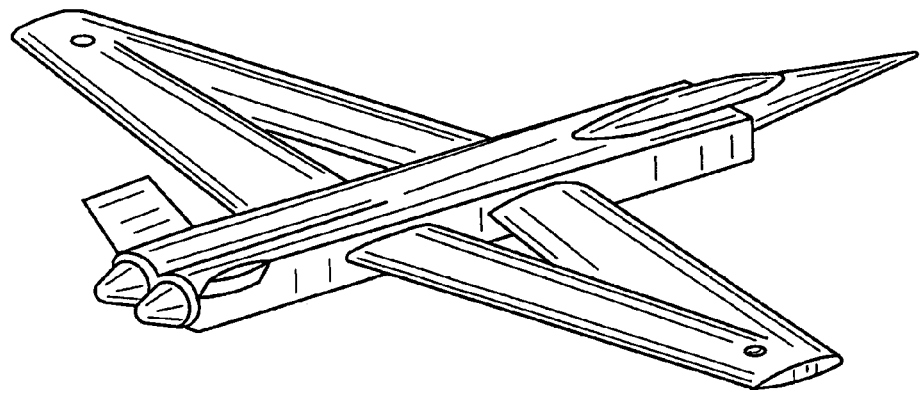
FIG. 4 depicts a variable geometry rhomboid wing aerodynamic body.

A fighter design is shown in FIG. 4, employing a variable geometry wing, where the wing root sections are moved back and forth to produce different sweep angles and vary the aspect ratio. Many practical versions of the mechanization of the variable geometry designs developed by the inventor are described in references 22–23.

Thus, an object of the invention is an aerodynamic body comprising a rhomboid wing, which may be fixed or movable so as to allow for variable geometry and changeable aspect ratio, and a torsion bar useful for affecting a change in the aerodynamic properties of a wing.

Figure 5:
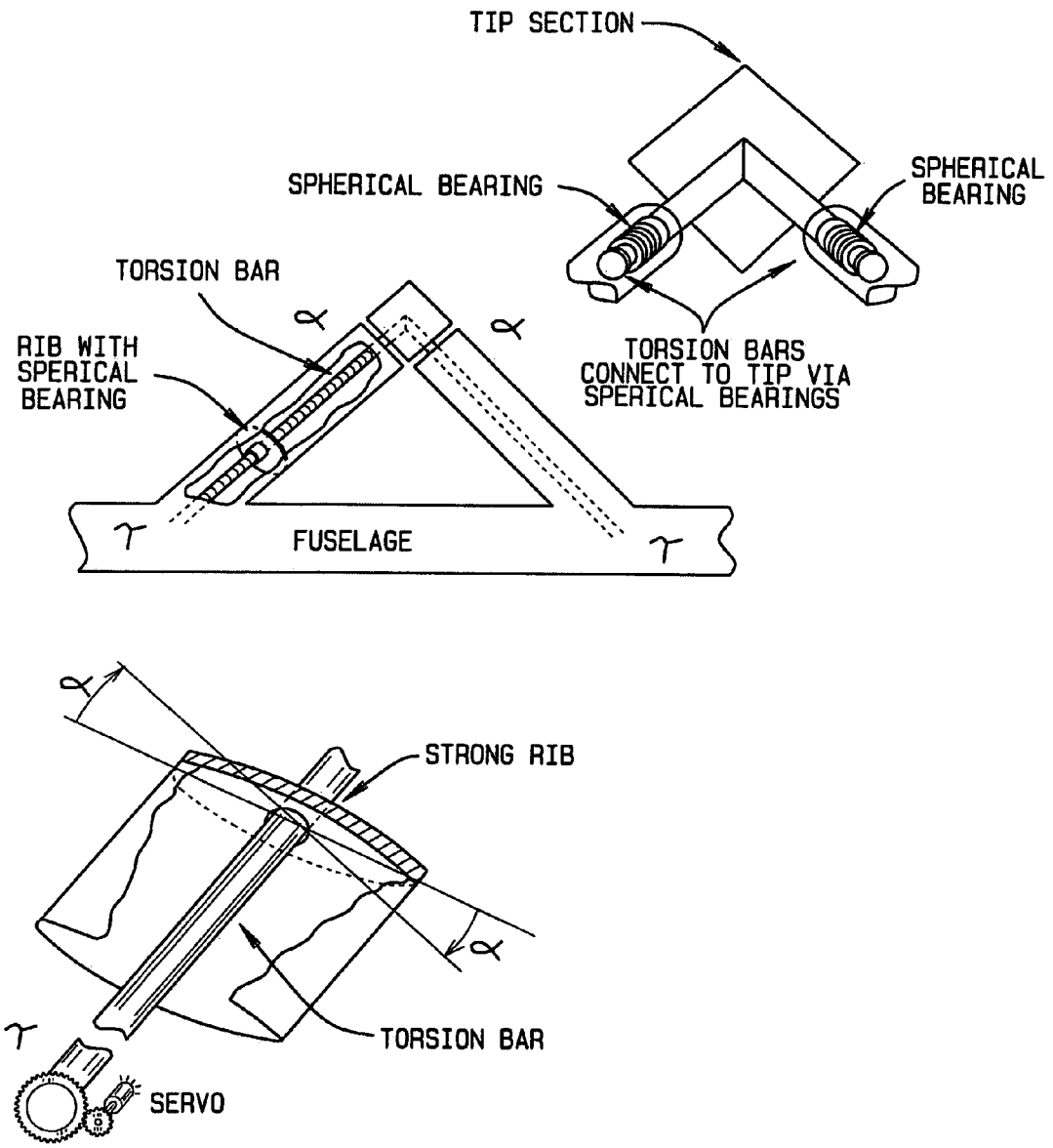
FIG. 5 depicts torsion bars within rhomboid wing, showing rib and bearing design.

One embodiment is shown schematically in FIG. 5 for a fixed geometry rhomboid wing. Here the front and aft wings on each side of the fuselage are twisted by single torsion bars. In another aspect, the use of stepped or concentric torsion bars is also applicable. According to this embodiment, a servo used to twist the in-board part of the torsion bar, which connects at the out-board end to a stiff rib used to twist the wing tip differentially from the root section (see FIG. 9).

Figure 6:
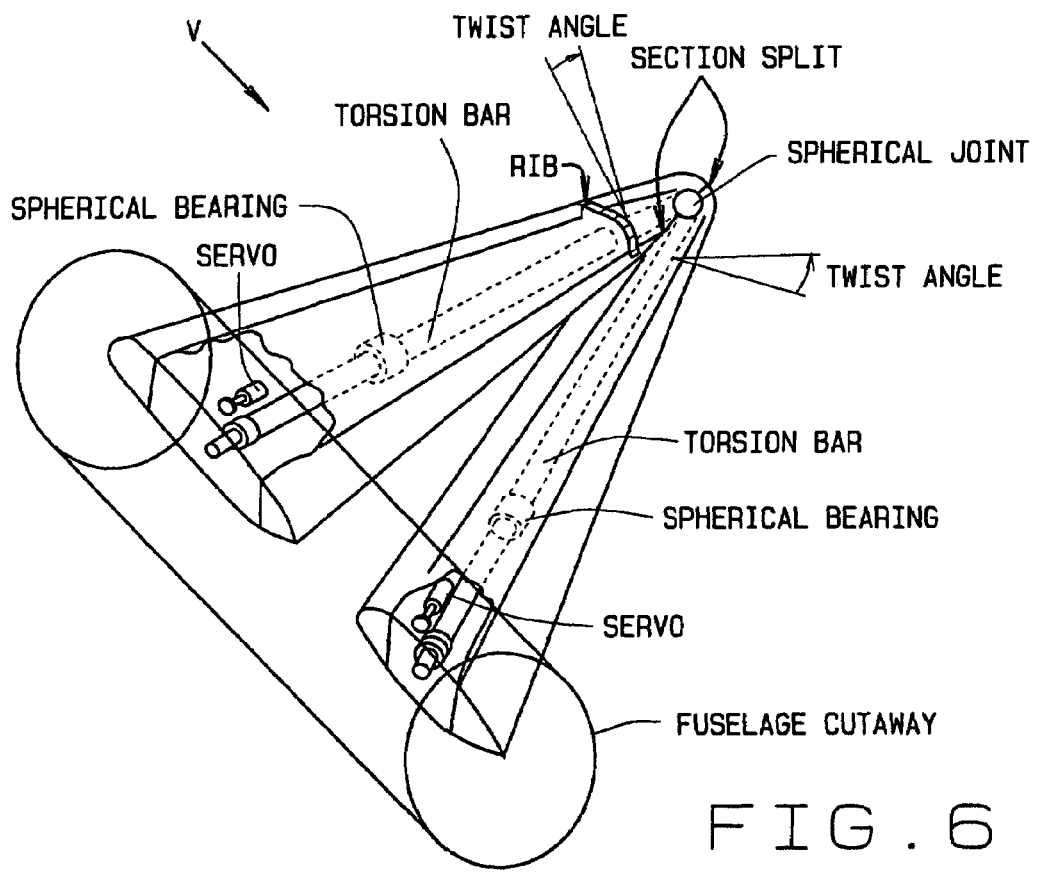
FIG. 6 depicts variable geometry rhomboid wing with torsion bar servos, ribs and spherical joint at wing tip.

To integrate the internal torsion bars into a coplanar rhomboid wing, a tip section was developed where the two torsion bars attach via bearings in the tip section. A set of small servos may be utilized at the tip for trimming to optimize aeroelasticity and drag. Spherical bearings are used with the ribs to prevent binding, especially at areas of large bending of the wing. Another aspect of a fixed rhomboid wing is shown in FIG. 6, wherein the tip connection comprises a spherical joint.

Figure 7:
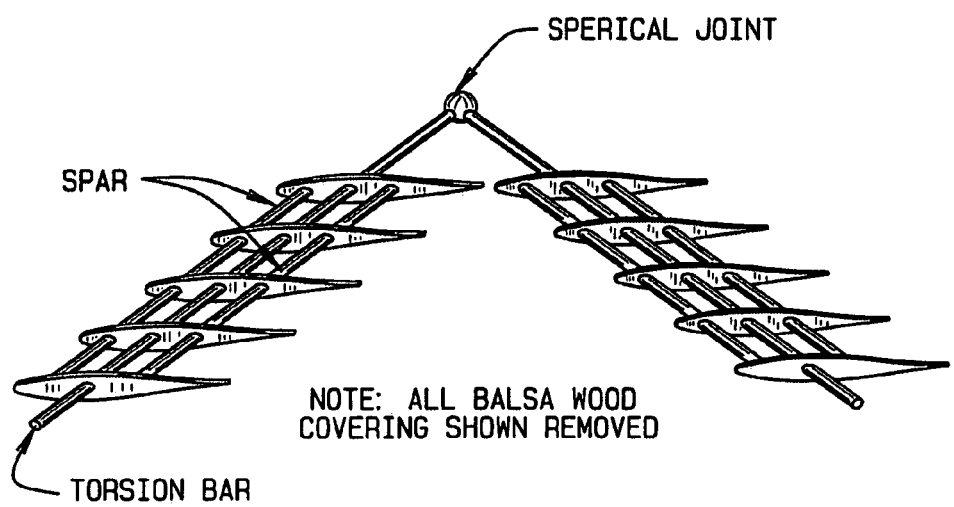
FIG. 7 depicts variable geometry rhomboid wing with torsion bars, spars and ribs, with spherical joint at wing tip.

A model was built to flutter test a rhomboid wing of fixed geometry that employed torsion bars. The model was designed with two spars for each wing, wherein the spars served for both bending force and torsion rigidity. When the spars deflect together, bending results. When the spars deflect differentially, torsion results. The torsion bar is the third spar, and can be controlled from the inboard end. It adds, selectively, both bending and torsion depending on how it is controlled. FIG. 7 shows the layout of the three spars for each part of a rhomboid wing assembly, with the tip connection shown as a spherical joint. The rib layout is also shown in that drawing. Thus, in yet another embodiment, the invention is directed to an aerodynamic body comprising a rhomboid wing, which can be fixed or moveable, a torsion bar, and one or more spars.

Figure 8:
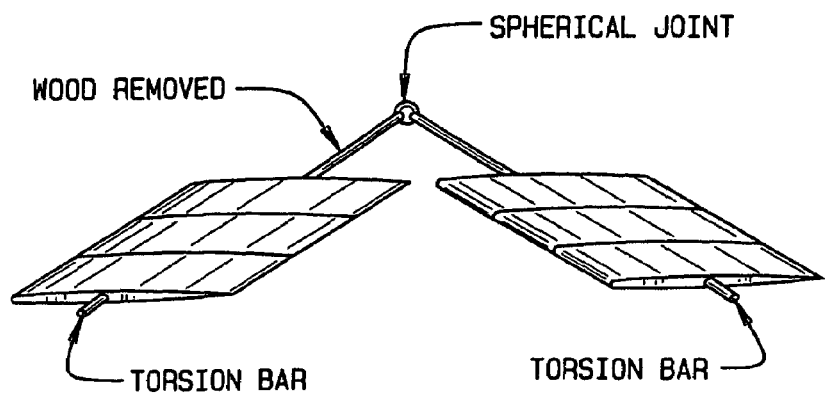
FIG. 8 depicts variable geometry rhomboid wing with torsion bars, spars and ribs, with spherical joint at wing tip, with skin covering several sections.

FIG. 8 shows the flutter model with filled in wing sections (i.e., skins) added to the model. In this particular model, the skin covered wing sections are separated to reduce any torsion stiffness contributions from the skins in order to emphasize torsion from differential bending of the front and aft spars. The sections of wing at the tip were left out for illustrative purposes.

Figure 9:
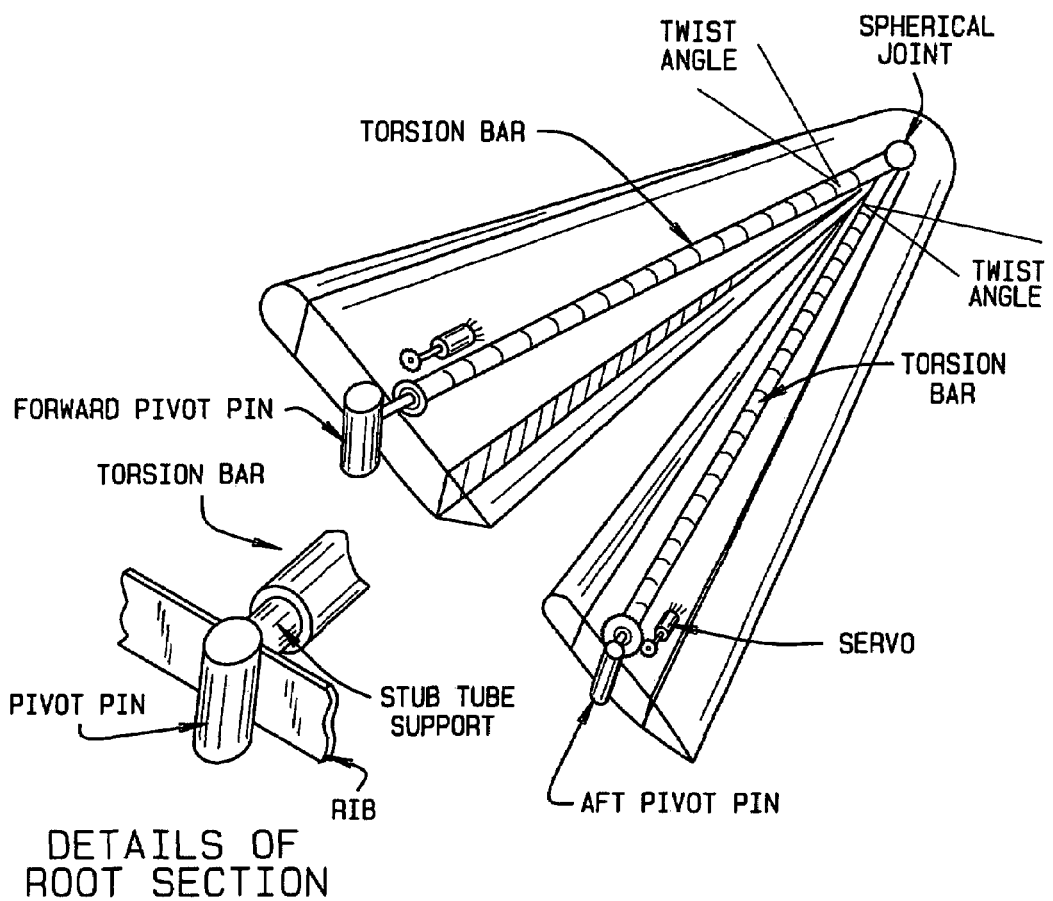
FIG. 9 depicts a preferred embodiment of the variable geometry rhomboid wing with torsion bars, indicating details of the root section proximal to what would be the fuselage.

An example of an embodiment of a variable geometry rhomboid wing with torsion bars of the instant invention shown in FIG. 9. The general features of a variable geometry rhomboid wing are retained, in which the root sections of the two wing halves can be moved forward and backward to change sweep and aspect ratio. Two vertical members are shown at the root ends, where connections to bearings that ride in slots in the fuselage/wing junction can be used to allow the root sections to be moved forward and backward, see the large arrows. The torsion bars are placed so as to provide for twist within the framework of variable geometry. The torsion bars can be driven from the root section, just outboard of the pivot pin for moving the wing root forward or back ward. Similarly, concentric, sequential, torsion bars may be used as originally suggested for simple wings. The wing sections, front (forward) and rear (aft), could be twisted as needed for control of the air loads on each side, either symmetrically or in a mirror image fashion, or in any combination of movements necessary for rolling and maneuvering. It is envisioned by the inventor that the wing design incorporating torsion bars to control the aerodynamic properties of the wing can eliminate or at least minimize the need for control surfaces, and likely produce a design that is smoother and lighter than the conventional flap, aileron, tab, elevator, spoiler, slat concepts.

REFERENCES

The following references are cited by number throughout this disclosure. Applicant makes no statement, inferred or direct, regarding the status of these references as prior art. Applicant reserves the right to challenge the veracity of statements made in these references, which are incorporated herein by reference.

1. "A New Concept For Smart Structures As Applied to Aeroelastic Tailoring Of Aircraft lifting Surfaces" by Dr. M. A. Ferman, ASEE Conference, Sinclair College, Dayton, Ohio, 10–12 Apr. 1997.

2. "Aeroelastic Tailoring Of Aircraft Lifting Surfaces Using A New Smart Structures Concept" By Dr. M. A. Ferman, Sixth International Conference on Recent Advances in Structural Dynamics, University of Southampton, ISVR, Southampton, UK, 14–17 Jul. 1997.

3. "A Modem Approach to Wing Warp for Aircraft Control" by Dr. M. A. Ferman, EAA Air Venture 1998, Osh Kosh, Wis., 29 Jul. to 4 Aug. 1998.

4. Ferman, M. A., and Haudrich, D. "Status Report on Research on Rhomboid Wings: Part I—Water Tunnel Studies," Parks College Report, Feb. 16th, 2001.

5. Haudrich, D. "Water Tunnel Studies of Tip Vortices and Flow Angularities of Joined Wing Structures'" AIAA Student Paper Conference, Iowa State University, Ames, Iowa, April 2001.

6. Ferman, M. A., and Haudrich, D. P., "Water Tunnel Studies of Tip Vortices, Flow Angularities, and Trailing Vortices of a Rhomboid Wing Design," EAA Air Venture 2001, Osh Kosh, Wis., 24–30 Jul. 2001.

7. Walkovitch, J., "The joined Wing: An Overview," AIAA-85-0274, AIAA 23$^{rd}$ Aerospace Sciences Meeting, Reno, Nev., January 1985.

8. Scheffer, J., "Diamonds are a Plane's Best Friend," *Popular Science Magazine*, January 1986.

9. Selberg, B. P. and Cronin, D. L., "Aerodynamic-Structural Optimization of Positive/Negative Stagger Joined Wing Configurations", AIAA-86-2626, AIAA/AHS/ASEE Aircraft Systems, Design and Technology Meeting, Dayton, Ohio October 1986.

10. Poladian, D. and Reinhard, D. J., "High Altitude Reconnaissance Aircraft Design," AIAA-89-2109, AIAA/AHS/ASEE Aircraft, Design, Systems and Operations Conference, Seattle, Wash., July 1989.

11. Kroo, I., and Gallman, J., "Aerodynamic and Structural Studies of Joined-Wing Aircraft," Journal of Aircraft, Vol. 28, No.1, pp. 74–81, January 1991.

12. Burkhalter, J., Spring, D., and Key, M., "Downwash for Joined-Wing Airframe with Control Surface Deflections," Journal of Aircraft, Vol. 29, No. 3, pp. 458–464, May–June 1992.

13. Gallman, J., and Smith, C., "Optimization of Joined Wing Aircraft," Journal of Aircraft, Vol. 30, No. 6, pp. 897–905, November–December 1993.

14. Gallman, J. W. and Kroo, I. M., "Structural Optimization for Joined-Wing Synthesis", *Journal of Aircraft*, Vol. 33, No. 1, pp.214–223., 1996.

15. Trifu, Octavian and Savu, George, "Unmanned Solar-Powered Aerial Surveyor Configured With an Aerodynamic Optimization Procedure", AIAA-97-2322, AIAA 5th Applied Aerodynamics Conference, Atlanta, Ga. June 1997.

16. Blair, M., Moorehouse, D., and Weisshaar, T., "System Design Innovation Using Multidisciplinary Optimization and Simulation," Release Pending.

17. "New Directions for Early Warning Aircraft Platforms," *Boeing News* Vol.59, Oct. 27, 2000.

18. Angelucci, A., "The Illustrated World Encyclopedia Of Civil Aircraft," Chartwell, Books, Inc., Page 21, 2001 Edition.

19. Lopez, E., "Water Tunnel and Wind Tunnel Studies of a Rhomboid Wing Design," MS Thesis, Parks College, St. Louis University, December 2002.

20. Aguilar, E., "Aeroelastic Analyses and Wind Tunnel Tests of A Rhomboid Joined Wing Model," M. S. Thesis, Parks College, St. Louis University, St. Louis, Mo., May 2004.

21. Mugica, I., "Buffet Studies of a Rhomboid Wing Fighter Model," MS Thesis, Parks College, Saint Louis University, St. Louis. Mo., Release Pending.

22. Ferman, M. A., "A Concept For a Variable Geometry Rhomboid Wing Design," 8 th International Conference on Recent Advances in Structural Dynamics, University of Southampton, ISVR, Southampton, UK, 14–16 Jul. 2003.

23. Ferman, M. A., and Mugica, I., "A Variable Geometry Rhomboid Wing Design Concept," EAA Air Venture 2003, Osh Kosh, Wis., Jul. 29–Aug. 4, 2003.

What is claimed is:

1. An aerodynamic body comprising
a fuselage,
a rhomboid wing system, wherein the wing system comprises a left forward wing, a right forward wing, a left aft wing and a right aft wing, wherein on either side of the fuselage, the aft wing and the forward wing are connected to each other through spherical joints and wing tips,
a torsion bar system comprising a torsion bar within each of the front right and left wings,
the torsion bars are connected to the fuselage and the spherical joints, and are capable of rotating the front left and right wings through a plurality of attack angles.

2. The aerodynamic body of claim 1, wherein the torsion bar system comprises a torsion bar in each of the right aft wing and the left aft wing, and the torsion bar of the right aft wing and the torsion bar of the left aft wing are each capable of being rotated by a torque applied to the root of each wing.

3. The aerodynamic body of claim 1, wherein the left forward wing, the left aft wing, the right forward wing and the right aft wing are capable of being moved in a forward and an aft direction along the fuselage to affect a change in wing sweep and aspect ratio.

4. The aerodynamic body of claim 3, wherein the aerodynamic body comprises four root sections, each of which is located at an area of contact to the fuselage of each of the left forward wing, the left aft wing, the right forward wing and the right aft wing; each root section comprises a pivot pin, a portion of a wing rib, and a stub tube support that contacts a torsion tube.

5. The aerodynamic body of claim 1, wherein each torque is generated by at least one servo.

6. The aerodynamic body of claim 4, wherein each torque is generated by at least one servo.

7. The aerodynamic body of claim 1, wherein at least one of the torsion bars is supported by a spherical bearing and a wing rib with bearings.

8. The aerodynamic body of claim 4, wherein at least one of the torsion bars is supported by a spherical bearing and a wing rib with bearings.

9. The aerodynamic body of claim 1, wherein each wing further comprises one or more spars.

10. The aerodynamic body of claim 4, wherein each wing further comprises one or more spars.

* * * * *